May 21, 1935.  A. P. LOFSTRAND  2,002,408
SHOCK COMPRESSING ATTACHMENT FOR GRAIN SHOCKERS
Filed Nov. 2, 1934  5 Sheets-Sheet 1

Inventor
Albin P. Lofstrand
By Geo. P. Kimmel
Attorney

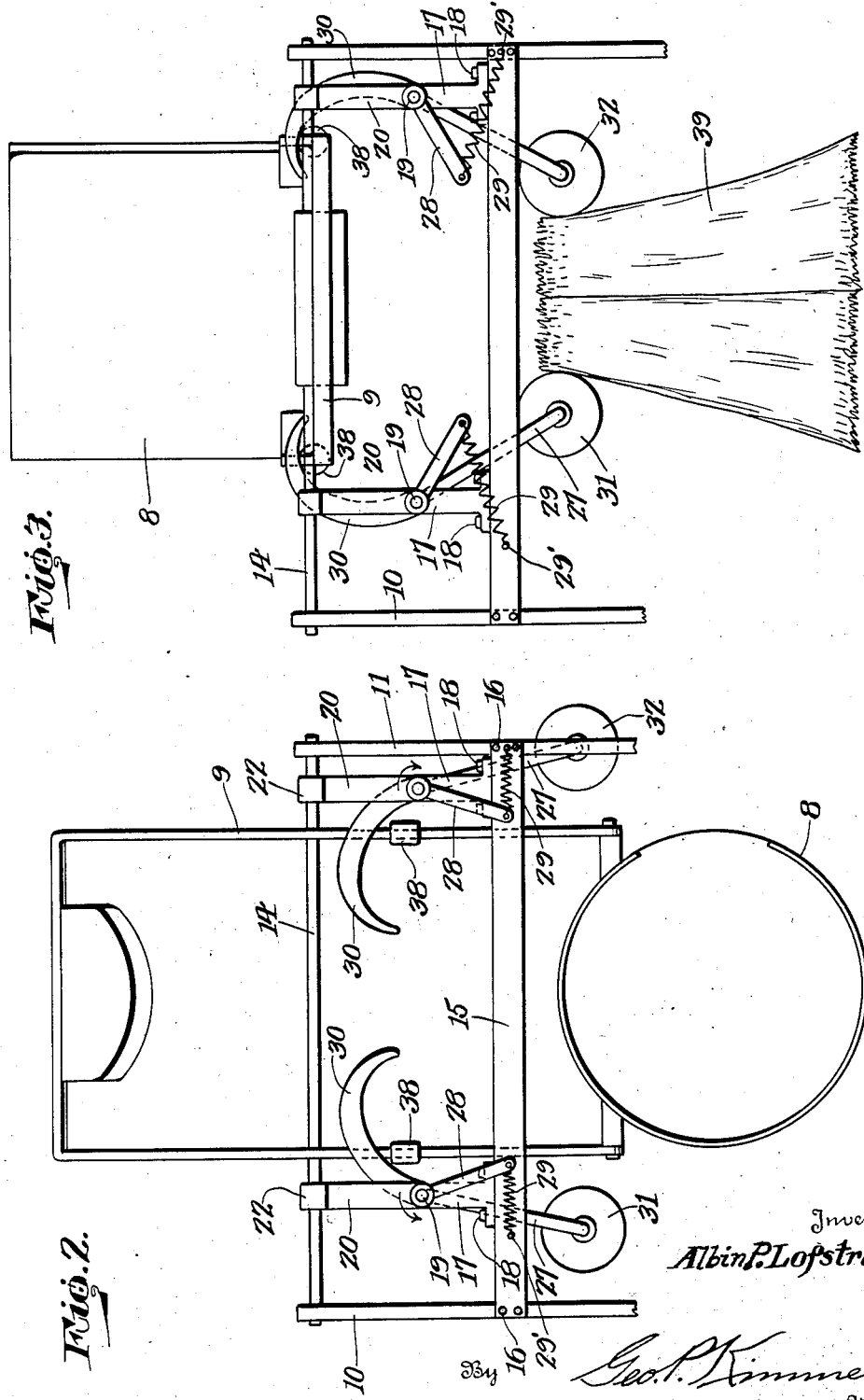

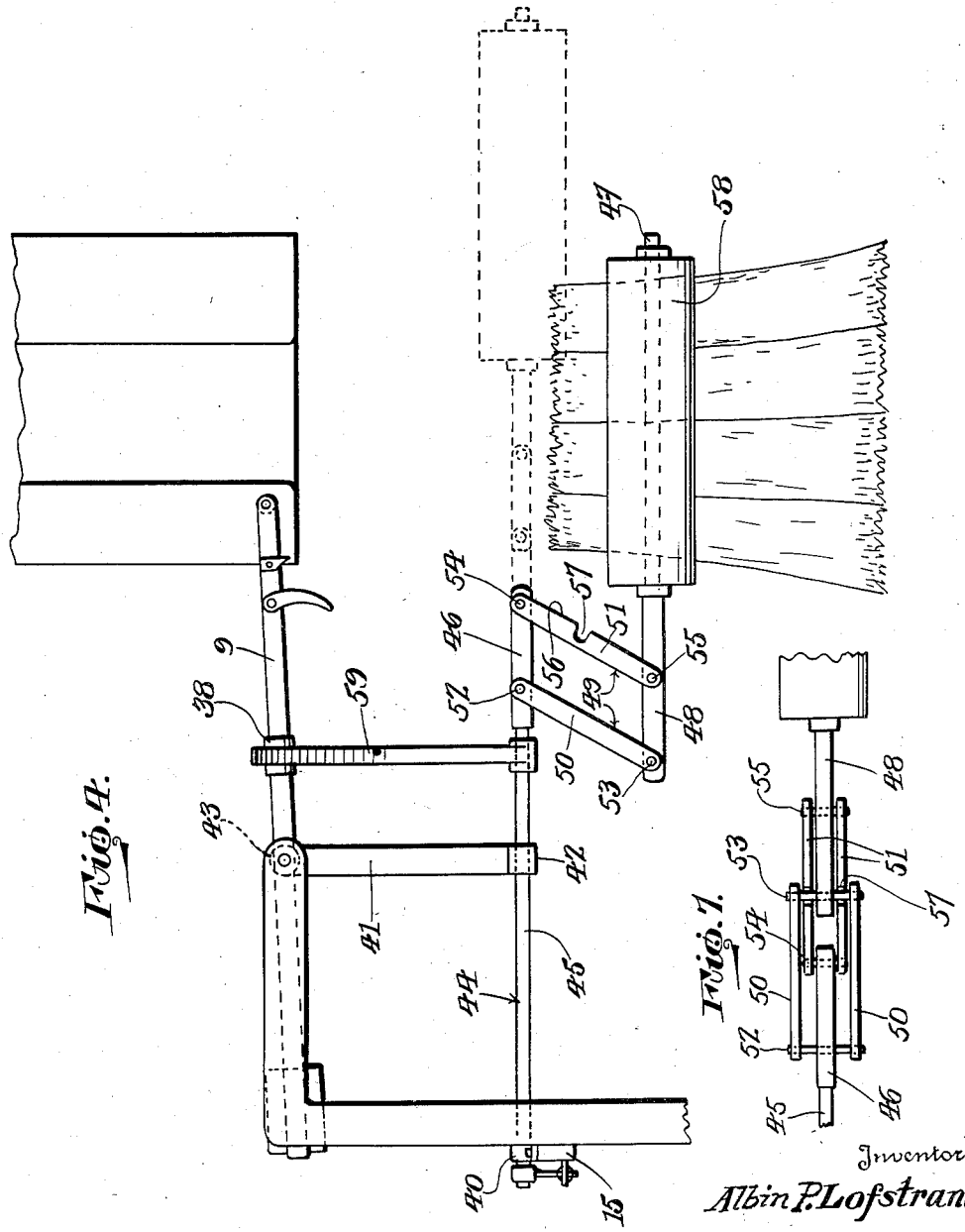

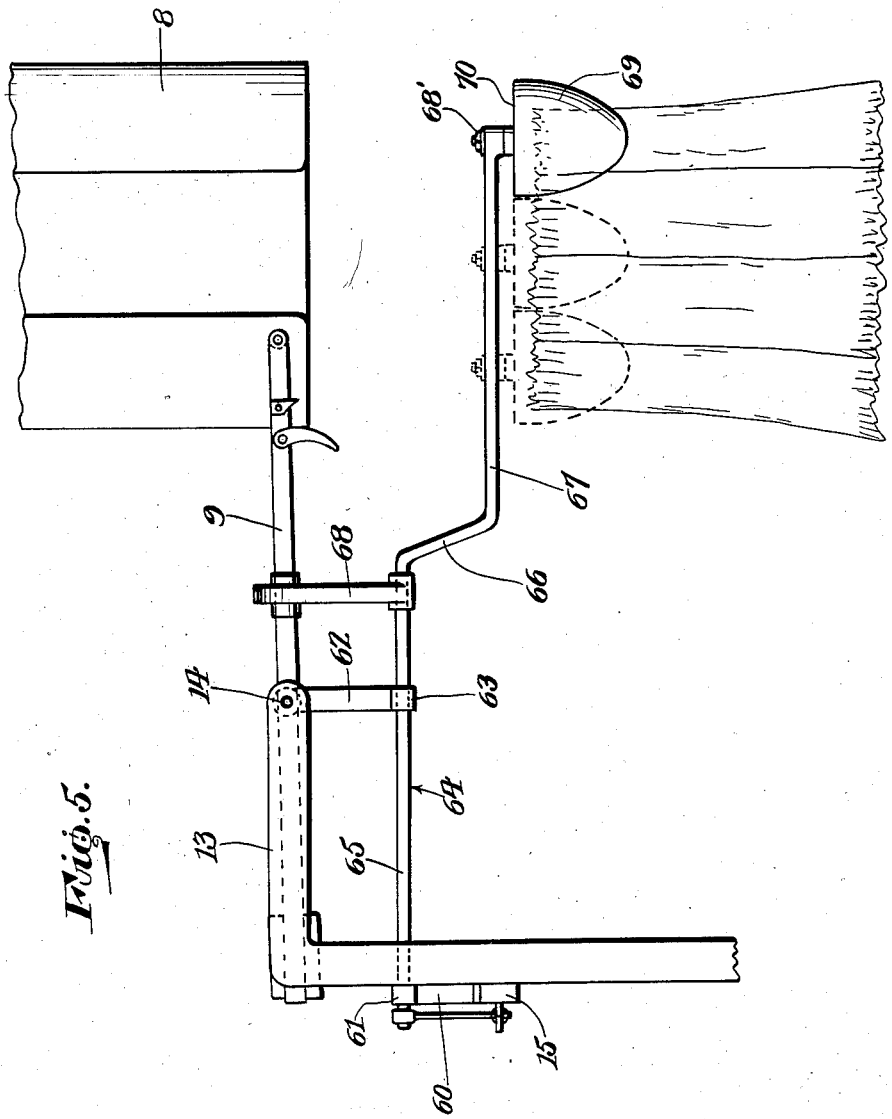

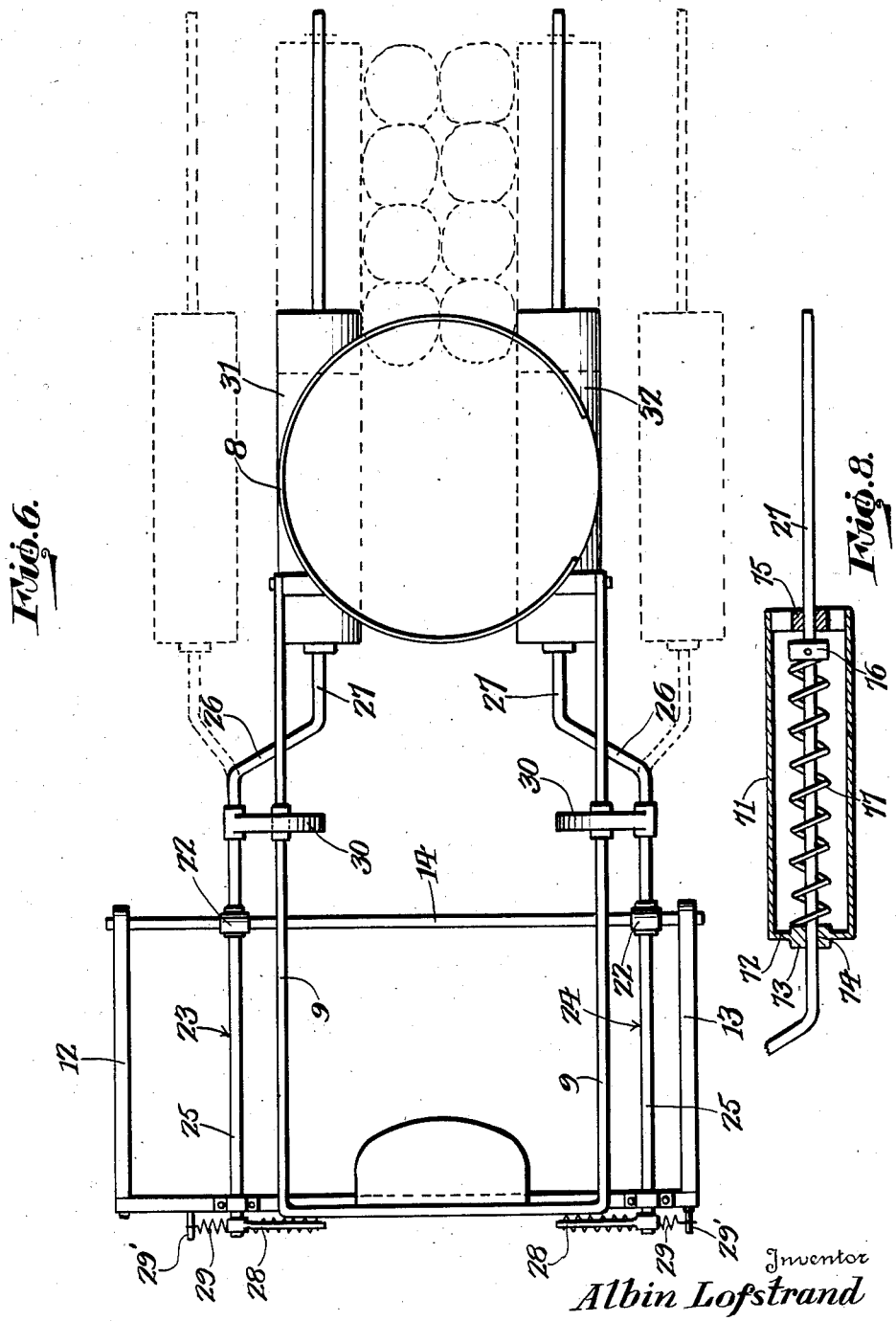

Patented May 21, 1935

2,002,408

UNITED STATES PATENT OFFICE 2,002,408

SHOCK COMPRESSING ATTACHMENT FOR GRAIN SHOCKERS

Albin P. Lofstrand, Chicago, Ill.

Application November 2, 1934, Serial No. 751,226

14 Claims. (Cl. 56—430)

My invention relates to a shock compressing attachment for grain shockers, and is designed primarily for use in connection with the automatic grain shocker disclosed by Letters Patent 1,968,782 granted to me July 31, 1934, but it is to be understood that the attachment is to be used with any form of grain shocker for which it is found applicable.

My invention has for its object to compress the shock, in a manner to form it of a contour to provide for the satisfactory seating thereof, and further to impart to the shock inherent means for maintaining it in an upright position upon the ground.

My invention has for its further object to compress the top of the shock at setting it whereby there is imparted thereto a tendency for standing in an upright position upon the ground.

Further objects of my invention are to provide in a manner as hereinafter set forth an attachment for the purpose referred to which is simple in its construction and arrangement, strong, durable, compact, readily installed with respect to a grain shocker, thoroughly efficient in its use, and comparatively inexpensive to set up.

To the above ends essentially and to others which may hereinafter appear my invention consists of such parts, and such combination of parts which fall within the scope of the invention as claimed.

In the drawings:

Figure 2 is front elevation of a fragmentary portion of the grain shocker provided with the attachment and with the latter and the shock dumping receptacle shown in inactive positions;

Figure 3 is a view similar to Figure 2 showing the shock dumping receptacle and attachment in active positions and the compressing position of the attachment relative to the shock;

Figure 4 is a side elevation illustrating a fragmentary position of the grain shocker and further showing the adaptation therewith of a modified form of shock compressing attachment and with the latter illustrated in full lines in inactive position and in dotted lines in active position;

Figure 5 is a view similar to Figure 4 of another modified form of shock compressing attachment;

Figure 1:
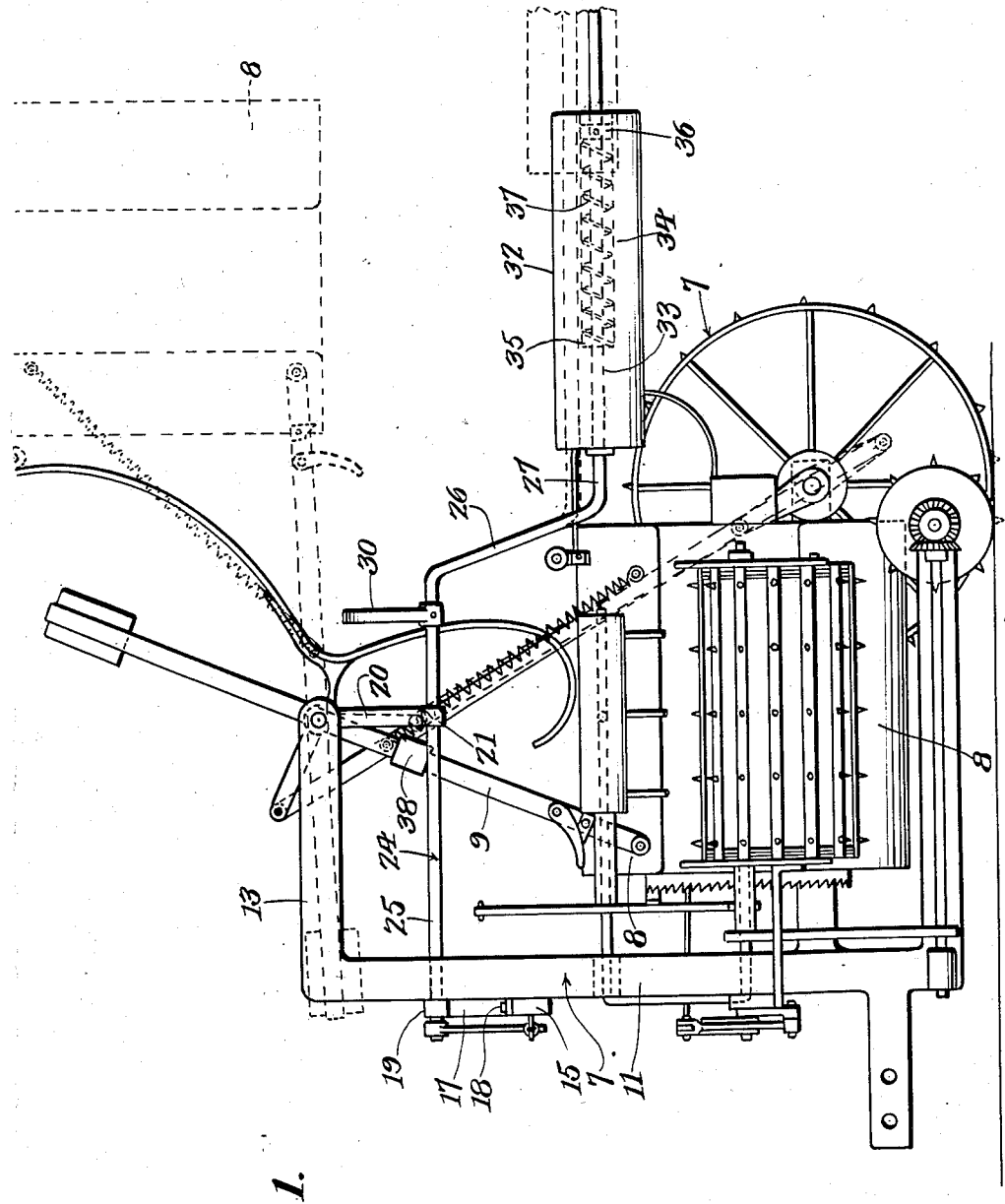
Figure 1 is a side elevation of a grain shocker, showing the adaptation therewith, of the shock compressing attachment and further illustrating in dotted lines the shock dumping receptacle in active position and in full lines and in dotted lines the attachment respectively in inactive and active positions.

Figure 6 is a top plan view showing the adaptation of the form of attachment illustrated in Figures 1, 2 and 3 with respect to the elements of the shocker with which it is associated; the shock in dotted lines; the inactive position of the attachment in dotted lines; the first active position of the attachment in full lines with respect to the shock; and the second active position of the attachment in dotted lines with respect to the shock;

Figure 7 is a fragmentary view in plan of a modified form shown in Figure 4; and Figure 8 is a longitudinal sectional view illustrating a modified form of spring controlled slidable revoluble compressing roller.

Referring to Figure 1 of the drawings 7 generally indicates a grain shocker of the construction disclosed by the Letters Patent aforesaid and which includes a shock dumping receptacle 8, a spring controlled counterbalanced yoke 9 having the free ends of its sides pivotally attached to opposite sides of the receptacle 8 in proximity to one end of the latter, uprights 10, 11, rearwardly extending arms 12, 13 at the upper ends of uprights 10, 11 respectively and a cross bar 14 connecting the rear ends of the arms 12, 13 together and upon which is pivoted yoke 9. It is thought unnecessary to describe the other parts of the grain shocker as the elements thereof referred to are those with which the attachment is associated.

The several forms of the attachment includes a support 15 in the form of an oblong bar having its rear side abutting the front edges of the uprights 10, 11 below the upper ends of the latter. The support 15 is secured at its ends to the uprights 10, 11 by the holdfast means 16.

With reference to Figures 1, 2, 3 and 6 the attachment includes a pair of spaced upstanding parallel members supporting members 17 seated upon the upper edge and secured to the support 15 by the holdfast means 18. The members 17 15 are of less height than the distance between support 15 and upper ends of uprights 10 and 11 and are formed with tubular heads providing bearings 19.

Suspended from the bar 14 is a pair of spaced parallel hangers 20 formed with tubular lower ends which constitute bearing 21 and align with the heads 19. The upper ends 22 of the hangers 20 are of tubular form for fixedly mounting on the bar 14. Extending through the aligning bearings 19, 21 is a pair of oppositely disposed rock shafts 23, 24 and each shaft consists of an upper forward stretch 25, an intermediate stretch 26 and a lower rear stretch 27. The stretch 26 extends downwardly and at a rearward inclination with respect to the rear end of the stretch 25. The latter and stretch 27 are disposed in parallel planes. The forward stretches of the shafts are supported by the bearings 19, 21 and extend forwardly and rearwardly with respect to the members 17 and hangers 20. The forward end of each shaft carries a depending crank arm 28 which is connected at its lower end to one end of a controlling spring 29. The other end of the latter is anchored to a pin 29' extended forwardly from support 15. The stretch 25 of each shaft rearwardly of the bearing 21 therefor is provided with an upstanding inwardly extending substantially segmental cam or rock arm 30 for the shaft and which functions to rock the shaft in the direction of the arrow Figure 2. The means for actuating the cams or rock arms 30 will be presently referred to.

The attachment includes a pair of revoluble horizontally disposed bodily slidable spring controlled shock compressing rollers 31, 32 mounted on the stretches 27 of the shafts 23, 24. Each roller is formed with an axial bore of two different diameters indicated at 33, 34. (Figure 1.) The junction of said diameters provides the roller with an internal shoulder 35. Each stretch 27 has fixed thereto a collar 36 which forms a bearing for the wall of that portion of greater diameter of the bore. Surrounding each stretch 27 and interposed between shoulder 35 and collar 36 is a controlling spring 37 having one end fixed to collar 36.

The cams or rock arms 30 are simultaneously shifted in opposite directions to rock the shafts 23, 24 in unison in the direction of the arrows (Figure 2) by a pair of actuators 38 carried by the sides of the yoke 9. The actuators are positioned on the sides of the yoke 9 between the transverse median and lower end of the yoke. The arrangement is such that as the yoke 9 is operated to move the receptacle 8 to dumping position the actuators 38 will ride against the inner faces of the cams or rock arms 30 whereby the shafts will be rocked in a direction to dispose the rollers 31, 32 on opposite sides of the dumped shock 39 and bear thereon due to the holding action between the cams 30 and actuators 38. As the rollers are slidably mounted on stretches 27 they will bind against and impart a compressing action to the top of shock 39 as the shocker moves forwardly, due to the fact that the rollers will slide rearwardly on the stretches 27, against the action of springs 37 until the forward ends thereof are clear of the shock 39, and after the rollers have cleared the shock, due to the forward travel of the shocker the controlling springs 37 will cause the rollers to assume the full line showing of Figure 1.

With reference to Figures 4 and 7 the modified attachment shown thereby includes a pair of spaced parallel bearings 40 of like form, only one shown and which is secured upon the top edge of support 15, and a pair of spaced parallel hangers 41 of like form and only one shown. The hangers 41 are of greater height than hangers 20 and have tubular lower ends constituting bearings 42 arranged in alignment with the bearings 40. The upper ends 43 of hangers 41 are tubular and fixedly mounted upon the cross bar 14. The attachment shown by Figures 4 and 7 includes a pair of parallel rock shafts 44 of like form and only one is shown. Each shaft consists of a forward section 45 journalled in a bearing 40 and a bearing 42 aligning with bearing 40 and having a squared rear end portion 46, a rear section 47 having a squared forward end portion 48 and an intermediate coupling section 49 of a construction to normally support the section 47 below the section 45. The section 49 is pivotally connected at two spaced points to the section 45 and to the section 47 and consists of a forward pair of spaced parallel links 50, a rear pair of spaced parallel links 51 and pivots 52, 53, 54 and 55. The pivot 52 connects one end of the links 50 to the forward part of rear end portion 46 of section 45 in spaced relation to the sides of the latter, the pivot 53 connects the other end of the links 50 to near the forward end of forward end portion 48 of the section 47 in spaced relation to the sides of the latter, the pivot 54 connects one end of the links 51 to near the rear end of the forward end portion 46 of section 45, at the side of the latter inwardly with respect to the links 50 and the pivot 55 connects the other end of links 51 to the sides of the forward end portion 48 of the section 47, at the sides of the latter and inwardly with respect to the links 50. The pivot 54 is arranged rearwardly of pivot 53. The rear edges 56 of the links 51 are cut out, as 57, to provide clearances for the pivot 53 when the section 47 is elevated to endwise opposed relation with respect to section 45 as shown in Figure 7. Revolubly mounted on the section 47 of each shaft 44 is a revoluble shock compressing roller 58. The rollers are arranged in parallel spaced relation. Carried by the section 45 of each shaft is an upstanding inwardly directed curved cam or rock arm 59, which overlaps, rides against and is shifted by an actuator 38 on the yoke 9 for the purpose of rocking a shaft 44 in a direction to move a roller 58 to bear against a side of the shock 39. The shafts 44, when rocked, dispose the rollers 58 in compressing engagement with opposite sides of the shock 39 (Figure 4) and as the shocker moves forwardly the rollers will have a vertically movement imparted to them, whereby shaft sections 47 will be moved to the dotted line position (Figure 4). On a continued forward movement of the shocker, the rollers 58 will clear shock 39 and fall with the sections 47 of the shafts 44 to the position shown in Figure 4. The shafts 44 are spring controlled in a manner similar to that shown in connection with shafts 23, 24.

With reference to Figure 5 the modified form of attachment shown thereby, consists of a pair of spaced parallel upstanding supporting members 60 of like form and only one of which is shown. Each member 60 has a tubular head constituting a bearing 61. The members 60 are anchored to the support 15. This form of attachment also includes a pair of spaced parallel hangers 62 of like form and only one of which is shown. The hangers 62 at their upper ends are fixedly suspended from the cross bar 14. The hangers 62 have tubular lower ends constituting bearings 63, aligning with the bearings 61. Mounted in the aligning bearings 61, 63 is a pair of oppositely disposed rock shafts 64 of like form and only one of which is shown. Each rock shaft consists of a forward stretch 65, an intermediate stretch 66 which depends from and extends inwardly at a rearward inclination with respect to the end of stretch 65 and a rear stretch 67. The stretches 65, 67 are disposed in parallel planes. The stretches 65 are mounted in the aligning bearings 61, 63. The intermediate stretches 66 are of less length than the intermediate stretches 26. The forward stretch 65 of each shaft 64, in proximity to the stretch 66 has fixed thereto an upstanding inwardly disposed cam or rock arm 68 of segmental contour. The rear end of the rear stretch of each shaft has revolubly suspended therefrom, as at 68', a vertically disposed shock compressing roller 69 of semi-oval contour having a flat upper end 70 positioned in proximity to, but spaced from stretch 67. The shafts 64 are spring controlled by a means similar to that employed for the shaft 23, 24. The cams or rock arms 68 are operated by a means similar to that employed for operating the cams or rock arms 30. The hangers 62 are of the same height as the hangers 20.

With reference to Figure 8 a hollow compressing roller is indicated at 71 and it includes a head 72 at one end formed with an enlarged central portion 73 provided with an axial opening 74. The other end of roller 71 is provided with an axially apertured spider 75. The roller 71 is revolubly mounted on and slidable lengthwise of the stretch 27 of a shaft 23 or 24. The stretch 27 extends through the opening 74 and spider 75 and has adjustably secured thereto, intermediate the ends thereof a collar 76. Surrounding the stretch 27 and interposed between the central portion 73 of head 22 and collar 76 is a coiled controlling spring 77 for roller 71. The latter functions in the same manner as a roller 31 or 32.

What I claim is:

1. A shock compressing attachment for grain shockers comprising the combination of a movable part of the shocker, spaced parallel rollers for compressing the top of a shock dumped from the dumping receptacle of the shocker, a pair of horizontally oppositely disposed rock shafts carrying said rollers, means for connecting said shafts to the shocker, and two pair of coacting elements for rocking said shafts in unison to active position with respect to the shock, one of the elements of each pair of coacting elements arranged in the path of the other coacting element of each pair of coacting elements, one of the coacting elements of each pair of coacting elements being carried by the said movable part of the shocker and the other coacting element of each pair of coacting elements being anchored to said shafts.

2. A shock compressing attachment of the construction set forth by claim 1 having the coacting element of each pair of coacting elements anchored to said shafts, upstanding, inwardly extending, of substantially segmental contour and overlapping and riding against the other coacting element of each pair of coacting elements.

3. A shock compressing attachment of the construction set forth by claim 1 having the shock compressing rollers slidably and revolubly mounted on said shafts and horizontally disposed.

4. A shock compressing attachment of the construction set forth by claim 1 having each of its shafts formed with a forward stretch, a depending inwardly extending intermediate stretch and a rear stretch, said forward and rear stretches being disposed in parallel planes and having the compressing rollers carried by said rear stretches.

5. A shock compressing attachment of the construction set forth by claim 1 having the compressing rollers revolubly supported from the rear portion of said shafts.

6. A shock compresssing attachment of the construction set forth by claim 1 having the shock compressing rollers disposed horizontally and slidably and revolubly mounted on said shafts, and spring controlling means for the rollers carried by the shafts.

7. A shock compressing attachment of the construction set forth by claim 1 having the shock compressing rollers horizontally disposed and revolubly mounted upon the rear of said shafts.

8. A shock compressing attachment for grain shockers comprising a shock compressing mechanism adapted to be carried by the shocker and having means positioned in the path of the dumped shock for compressing the upper portion of the latter, said mechanism including coacting separate means, one of said separate means being anchored to parts of said mechanism and the other being anchored to a movable part of the shocker, the said separate means coacting during the bunch dumping operation of the shocker for actuating said mechanism for moving it to shock compressing position.

9. A shock compressing mechanism of the construction set forth by claim 8 having as parts of said mechanism a pair of spring controlled rock shafts provided with shock compressing rollers.

10. In combination, a grain shocker including a shock dumping receptacle, a shock compressing means carried by the shocker and including shock compressing rollers arranged in the path of the dumped shock for compressing the upper portion of the latter, and coacting means carried by the shocker and said mechanism for moving the rollers to shock compressing position during the shock dumping operation.

11. The invention as set forth in claim 10 having the shock compressing rollers horizontally disposed and revolubly mounted.

12. The invention as set forth in claim 10, having the shock compressing rollers horizontally disposed, revolubly mounted and spring controlled.

13. The invention, as set forth in claim 10, having the shock compressing rollers vertically disposed and revolubly mounted.

14. The invention, as set forth in claim 10, having the shock compressing rollers revolubly mounted and the mounting for said rollers spring controlled.

ALBIN P. LOFSTRAND.